US010387889B1

(12) United States Patent
Hanna et al.

(10) Patent No.: US 10,387,889 B1
(45) Date of Patent: Aug. 20, 2019

(54) BRAND RECOGNITION AND PROTECTION IN MOBILE APPLICATIONS

(71) Applicant: Symantec Corporation, Mountain View, CA (US)

(72) Inventors: Steve Hanna, Oakland, CA (US); Anthony John Bettini, San Francisco, CA (US); Kevin Watkins, San Francisco, CA (US); Michael Price, San Ramon, CA (US); Domingo J. Guerra, San Francisco, CA (US)

(73) Assignee: Symantec Corporation, Mountain View, CA (US)

( * ) Notice: Subject to any disclaimer, the term of this patent is extended or adjusted under 35 U.S.C. 154(b) by 480 days.

(21) Appl. No.: 14/055,096

(22) Filed: Oct. 16, 2013

Related U.S. Application Data

(60) Provisional application No. 61/715,196, filed on Oct. 17, 2012.

(51) Int. Cl.
| | | |
|---|---|---|
| *G06Q 10/10* | (2012.01) | |
| *G06Q 30/02* | (2012.01) | |
| *G06Q 30/06* | (2012.01) | |
| *G06Q 30/00* | (2012.01) | |
| *G06Q 50/00* | (2012.01) | |

(52) U.S. Cl.
CPC .......... *G06Q 30/018* (2013.01); *G06Q 50/01* (2013.01)

(58) Field of Classification Search
CPC ..... G06Q 50/018; G06Q 50/01; G06Q 30/018
USPC .................................................. 705/1.1–912
See application file for complete search history.

(56) References Cited

U.S. PATENT DOCUMENTS

2012/0240236 A1* 9/2012 Wyatt et al. .................... 726/25
2013/0202213 A1* 8/2013 Adamek et al. ............. 382/201

* cited by examiner

*Primary Examiner* — Jonathan P Ouellette
(74) *Attorney, Agent, or Firm* — Patent Law Works LLP

(57) ABSTRACT

Techniques for brand recognition and protection in applications ("apps") for mobile devices are disclosed. In some embodiments, brand recognition and protection in apps for mobile devices includes extracting a plurality of features of an app; comparing the plurality of features with a target set of features associated with an entity; and determining whether the app violates a policy for brand recognition and protection for the entity based on the comparing the plurality of features with the target set of features associated with the entity.

19 Claims, 3 Drawing Sheets

BRAND RECOGNITION AND PROTECTION IN MOBILE APPLICATIONS

CROSS REFERENCE TO OTHER APPLICATIONS

This application claims priority to U.S. Provisional Patent Application No. 61/715,196 entitled BRAND RECOGNITION AND PROTECTION IN MOBILE APPLICATIONS filed Oct. 17, 2012, which is incorporated herein by reference for all purposes.

BACKGROUND OF THE INVENTION

An application, also referred to as an "app," generally refers to a software application that executes on a computing device, such as a mobile device. For example, mobile devices include smart phones, tablets, laptops, and/or other mobile devices. Various application platforms exist for different operating systems, such as Apple iOS® platforms, Google Android® platforms, and Microsoft Windows® platforms. Application markets exist for each of these application platforms, which can make available thousands to millions of different apps for such platforms.

For example, various apps are available for executing on smart phones such as the Apple iPhone® or Samsung Galaxy®, tablets such as the Apple iPad® or Google Nexus®, embedded devices executing the Google Android® operating system such as those shipped by Mentor Graphics and their partners, and computer operating systems such as Apple Mac OS X® and Microsoft Windows 8®.

BRIEF DESCRIPTION OF THE DRAWINGS

Various embodiments of the invention are disclosed in the following detailed description and the accompanying drawings.

DETAILED DESCRIPTION

Figure 1:
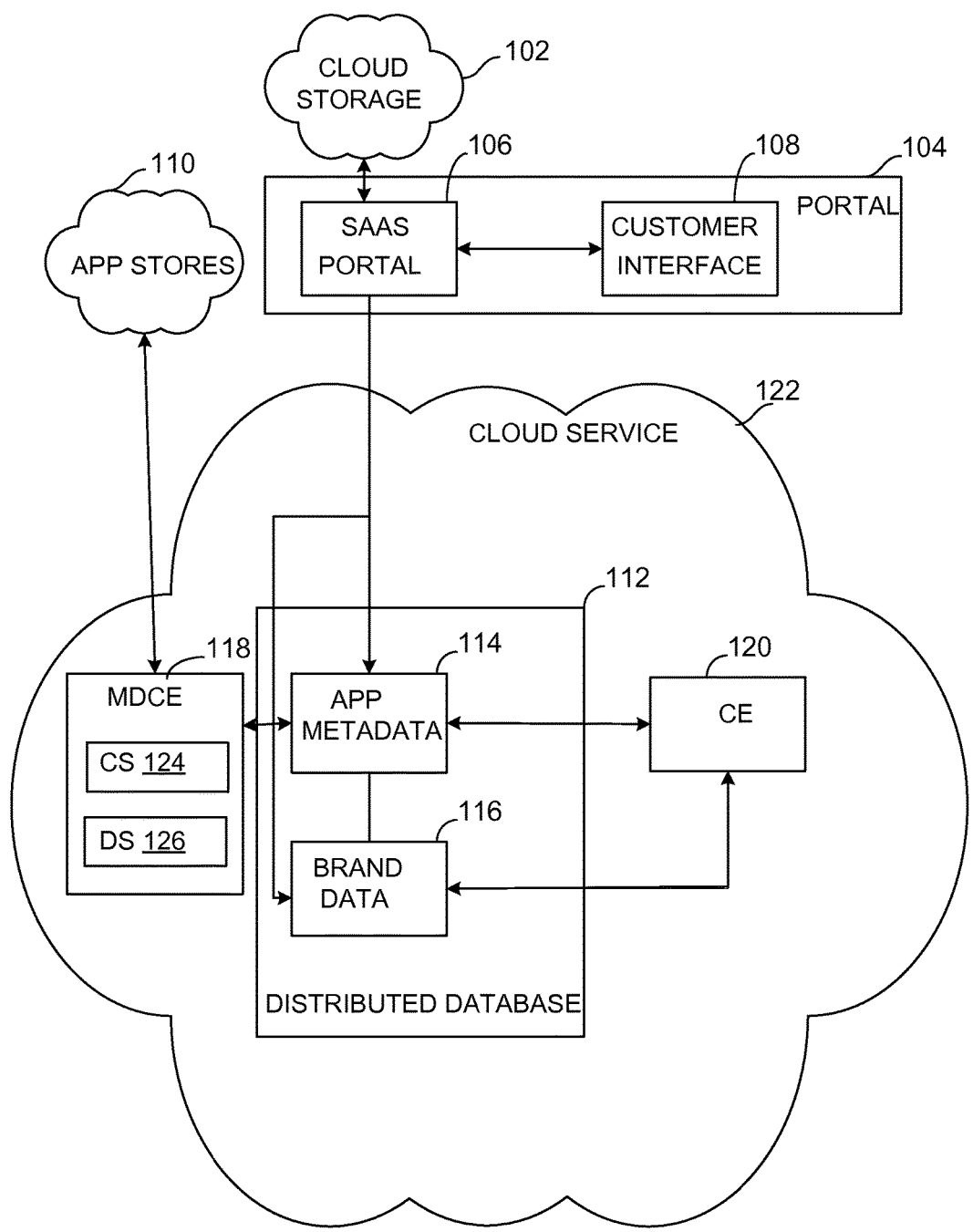
FIG. 1 is a functional block diagram of a system for providing brand recognition and protection in applications ("apps") for mobile devices in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As the number of apps (e.g., applications for mobile devices) available to users (e.g., end users) continues to increase, a growing threat and trend of brand misuse in association with apps has surfaced. Apps can be downloaded from official marketplaces, such as public app stores like the Google Play® store, the Apple App® Store, the Amazon Appstore for Android®, as well as from a variety of third party markets that can vary by region or country. As these repositories of apps continue to grow, both marketplace maintainers and third parties have rushed to provide scanning and security capabilities in an attempt to keep the marketplace free of risky and malicious code. Thus far, the focus of security targeted at these app marketplaces has mostly dealt with end-user security and protection from malware and spyware.

However, another problem exacerbates this increasing threat of brand misuse in association with apps. Untrustworthy developers can use trade names (e.g., brands, logos, or slogans) to make their apps appear to be legitimate. For example, untrustworthy developers can attempt to make their app(s) appear to be legitimate and/or official by use of a brand or logo associated with a legitimate or trusted entity in order to gain creditability or to intentionally mislead users. As another example, untrustworthy developers can attempt to deliver their app(s) or content by repackaging such with an app from a legitimate or trusted entity in order to gain creditability or to intentionally mislead users. Such activities by untrustworthy developers can result in spyware installation, unwanted advertising, and even malware being delivered through such apps from untrustworthy developers.

Using a trade name of an entity without permission and associating it with an app unrelated or unapproved by the entity (e.g., the rights holder of the trade name, which may be trademark/service mark protected) can also intentionally or unintentionally tarnish the brand and/or reputation of the entity. For example, many app developers use unauthorized trademarks, branding, logos, and slogans to give their app increased credibility. However, these unauthorized uses of trademarked brands in unofficial applications can unduly harm an entity, such as a brand or reputation of the entity (e.g., a company, conglomerate, non-profit organization, governmental entity, or another form of entity). As an example, such apps can include unauthorized associations with trademarks, branding, logos, and slogans of an entity, and such apps can also include undesirable content/features, such as malware, spyware, or threaten a user's privacy, which can harm a brand or reputation of the entity.

What are needed are techniques for recognizing brands and protecting against the unauthorized use of brands in applications for mobile devices.

Accordingly, techniques for brand recognition and protection in applications ("apps") for mobile devices are disclosed. For example, using such techniques, a system or service, such as a cloud-based app analysis system or service, can scan one or more apps to determine whether any of the apps are violating a brand protection policy of an entity and report any such apps associated with the policy violations (e.g., including a source of such apps and behavior or content that triggered a policy violation) to the entity.

For example, techniques for brand recognition and protection in apps for mobile devices can be used by an entity, such as a company (e.g., ACME Company) that is concerned with protecting its brands or other content (e.g., resources) associated with the company to ensure that apps that are available from public app stores or other app marketplaces do not violate ACME Company's policy for brand recognition and protection (e.g., by using ACME Company's trade name(s) without authorization, by using copyrighted content, such as images, movies, songs, or other copyrighted content without authorization, or by inserting inappropriate content or privacy tracking features into otherwise legitimate versions of an ACME Company app repackaged with such unauthorized content/behavior(s)).

As another example, techniques for brand recognition and protection in apps for mobile devices can be used by an entity, such as a banking company (e.g., ACME BANK) to ensure that apps that are available from public app stores or other app marketplaces do not violate ACME BANK's policy for brand recognition and protection (e.g., by using ACME BANK's trade name(s) without authorization, by masquerading as an ACME BANK app by providing a confusingly similar login page and GUI, by using an ACME BANK authentication server, by redistributing an originally valid version of an ACME BANK app repackaged with inappropriate content, such as malware, adware, spyware, and/or other unapproved content, or by redistributing an originally valid version of an ACME BANK app in a geo/region or from an app store source that is not authorized by ACME BANK).

These and various other examples for applying techniques for brand recognition and protection in apps for mobile devices are discussed below with respect to various embodiments.

In some embodiments, brand recognition and protection in apps for mobile devices includes extracting a plurality of features of an app; comparing the plurality of features with a target set of features associated with an entity; and determining whether the app violates a policy for brand recognition and protection for the entity based on the comparing the plurality of features with the target set of features associated with the entity.

In one embodiment, the app is determined to be in violation of the policy for brand recognition and protection for the entity if one or more of the extracted features are associated with one or more resources identified as associated with the entity, and the app is not authorized to be associated with the one or more resources identified as associated with the entity. For example, such resources can include one or more of the following: a trade name (e.g., a brand, logo, or slogan, which may be protected as a trademark by the entity or otherwise associated with the entity), a software development kit (SDK), an authentication server (e.g., an authentication server that the app attempts to authenticate with during execution), an advertisement (ad) identifier (ID), an image, a video, an audio file, a graphical user interface (GUI) element or similarity, and/or various other resources that can be associated with the entity.

In one embodiment, brand recognition and protection in apps for mobile devices further includes receiving the app for inspection. For example, the app can be available from a public app store or another source.

In one embodiment, brand recognition and protection in apps for mobile devices further includes performing a static analysis on the app during the comparing the plurality of features with the target set of features associated with the entity. For example, performing static analysis can include performing a disassembly/byte code pass phase that includes inspecting byte code or assembly language (e.g., if applicable) of the app to determine what the app is supposed to do, such as how it is coded to perform (e.g., native instructions and virtual machine (VM) byte codes can be processed and analyzed, which can include extracting a control flow graph, method and function names, strings, data flow within the app's executable, and/or other information to facilitate a static analysis of the functionality performed by the app).

In one embodiment, brand recognition and protection in apps for mobile devices further includes performing a dynamic analysis on the app during the comparing the plurality of features with the target set of features associated with the entity. For example, performing the dynamic analysis can include simulating a plurality of behaviors of the app during execution on a mobile device platform (e.g., performing an instrumented emulation that can include hosting a series or farm of emulators, such that once the app is executing in the emulated environment, the dynamic analysis phase can collect data, for example, on API calls that occur including the values returned from those APIs, so that a rule set can be applied to that data set, and/or GUI/screen shots functionality can be monitored and captured, and/or various other behaviors of the app can be monitored for performing various techniques as further described herein). As another example, during a dynamic analysis, various other behaviors can be identified as potential behavior related features that can be extracted, such as an app's attempt(s) to authenticate with a particular authentication site/server (e.g., based on an app classification of the app into a particular app category such as a game, it can be determined that such a gaming app would not be expected to attempt to authenticate to the ACME BANK authentication server), in app updates/purchased, other apps downloaded, and/or other behaviors.

In one embodiment, brand recognition and protection in apps for mobile devices further includes generating a report based on the comparing the plurality of features with the target set of features of the entity.

In one embodiment, brand recognition and protection in apps for mobile devices further includes generating a score based on the comparing the plurality of features with the target set of features of the entity. In one embodiment, brand recognition and protection in apps for mobile devices further includes outputting a score that is generated based on the comparing the plurality of features with the target set of features of the entity. For example, a score can be generated based on the plurality of features extracted from the app using a scoring policy (e.g., the scoring policy can be customized by the entity, which can score certain target features differently).

In one embodiment, brand recognition and protection in apps for mobile devices further includes periodically repeating such analysis of the app. For example, different versions of the app can be analyzed periodically (e.g., a new version of the app, such as an updated version or a version for a new app platform or country/region). As another example, the app can be analyzed periodically using an updated target set of features or using an updated policy (e.g., an updated customized policy for the entity). As yet another example, the app can be analyzed periodically to attempt to extract a new set of features from the app for further analysis.

In one embodiment, brand recognition and protection in apps for mobile devices further includes extracting an authentication server that the app attempts to authenticate with during execution (e.g., emulated execution on a virtual mobile device). For example, determining whether the authentication server (e.g., exact match) is associated with the entity can be used to determine whether the app violates the policy for brand recognition and protection for the entity.

In one embodiment, brand recognition and protection in apps for mobile devices further includes extracting a feature associated with a Software Development Kit (SDK). For example, determining whether the SDK is associated with the entity can be used to determine whether the app violates the policy for brand recognition and protection for the entity.

In one embodiment, brand recognition and protection in apps for mobile devices further includes extracting a trade name (e.g., a logo, brand, or slogan) from the app. For example, determining whether the trade name is associated with the entity (e.g., exact match or similar match) can be used to determine whether the app violates the policy for brand recognition and protection for the entity.

In one embodiment, brand recognition and protection in apps for mobile devices further includes extracting a screen shot(s) and/or graphical user interface (GUI) element(s) from the app during execution (e.g., emulated execution on a virtual mobile device). For example, determining whether the screen shot(s) and/or graphical user interface (GUI) element(s) are associated with the entity (e.g., exact match or similar match) can be used to determine whether the app violates the policy for brand recognition and protection for the entity.

In one embodiment, brand recognition and protection in apps for mobile devices further includes verifying an ad network related information (e.g., an ad network identifier (ID)) extracted from the app. For example, determining whether the ad network ID is associated with the entity can be used to determine whether the app violates the policy for brand recognition and protection for the entity (e.g., an app can be compromised by a third party by replacing the ad network ID with a different ad network ID, or inserting the different ad network ID, so that the third party can receive ad credits for the distributed app, thereby effectively stealing ad revenue from the entity).

FIG. 1 is a functional block diagram of a system for providing brand recognition and protection in applications ("apps") for mobile devices in accordance with some embodiments. In one embodiment, an architecture for providing brand recognition and protection in apps for mobile devices includes a Metadata Collection Engine (MDCE) 118, an End User Portal and interface (EUP or portal) 104, and a Comparison Engine (CE) 120, which can facilitate determining whether an app is in violation of a policy for brand recognition and protection for an entity (e.g., if one or more of the extracted features are associated with one or more resources identified as associated with the entity, and the app is not authorized to be associated with the one or more resources identified as associated with the entity). As shown, MDCE 118 and CE 120 are implemented as part of a cloud service 122. For example, portal 104 and cloud service 122 can be provided as a web service or cloud service, which can be executed on one or more servers that include one or more processors for executing software implemented functions (e.g., using a hosted service provider, such as Amazon Web Services or another service provider).

As shown in FIG. 1, while presented as sequential process steps, such process steps can be performed asynchronously. MDCE 118 is implemented as a part of a cloud service for brand recognition and protection, shown as cloud service 122. In particular, MDCE 118 scrapes and downloads apps from app stores. For each app, MDCE 118 analyzes the app (e.g., using various static and dynamic techniques, such as described herein, to extract one or more features from the app), extracts metadata from the app, and stores the extracted app metadata 114 in a distributed database 112 (e.g., or another form of data store) for the cloud service. For example, MDCE 118 can automatically extract features from an app (e.g., an app for an iOS platform, Android platform, Microsoft platform, and/or other mobile device operating system/device platform) and/or from the market place source of the app, including one or more of the following: app origin/source information (e.g., metadata associated with the market place source for the app, such as distributor (as a distributor/developer may have a bad reputation, which can be used as input for whether the app desires to be associated with that distributor/developer)), comments, and/or other information associated with the source of the app in a public app store or other source of the app), images, executable code (e.g., native binary), script or source code, included files, HTML (e.g., HTML files), text (e.g., text files), images (e.g., image files), video (e.g., video files), audio (e.g., audio files), embedded files, compressed archives, certificates/signed files, advertising identifiers, SDKs used in the app, authentication server identifiers, GUI/screen shots of various stages of the app during execution, and/or other features or attributes that can be extracted from the app during static and/or dynamic analysis. MDCE 118 stores such extracted features of the app in app metadata 114.

For example, a user for a customer of the cloud service for brand recognition and protection can visit portal 104 by interacting with a customer interface 108 of a software as a service (SAAS) portal 106 to input various brand information associated with an entity (e.g., customer's company). For example, the user can input trade name(s) (e.g., brands, logos, slogans, and/or other trade names related text, images, videos, or sounds) associated with the entity, an ad ID(s) associated with the entity's app(s), a private or license restricted SDK associated with the entity's app(s), an authentication server associated with the entity's app(s), and/or other resources that can provide a target set of features (e.g., unique features) for analysis using various techniques described herein. As another example, the user can upload one or more apps associated with the entity, and one or more features can be automatically extracted (e.g., similarly using MDCE 118) based on analysis techniques described herein to identify unique features of that app that can be used to provide a target set of features for analysis (e.g., the potential target set of features can be automatically extracted from the uploaded app and can then be presented to a user for the customer to verify which extracted features to use for the target set of features as being resources uniquely associated with the entity, such as a trade name(s), image(s), URL(s), authentication server(s), ad ID(s), SDK (s), text, and/or other resources or data). The various brand information that is uploaded or extracted is stored in brand data 116 of distributed database 112. As further described below, a comparison engine (CE) 120 of cloud service for brand recognition and protection 122 uses such brand information to facilitate the generation of a report that identifies any apps that were determined to be in violation of a policy for brand recognition and protection for the entity, and the report is output to the user using portal 104 (e.g., the report can identify the apps and any supporting data that triggered the violation of the policy by such apps, such as which trade names are being used by the apps and/or other violations). As also shown, portal 104 is in communication with cloud storage 102 for storing, for example, customer reports, customer preferences and user information, and/or other information.

In one embodiment, Comparison Engine (CE) 120 of cloud service for brand recognition and protection 122 uses app metadata 114 and brand data 116 to determine whether an app is in violation of a policy for brand recognition and protection for the entity (e.g., the policy can also be stored in brand data 116). For example, CE 120 can compare extracted app metadata 114 for an app with brand data 116 for an entity and determine whether the app is in violation of a policy for brand recognition and protection for the entity. Based on such comparison for each analyzed app, a report can be generated that identifies any apps that are in violation of the policy for brand recognition and protection for the entity. For example, the report can include a score based on the analysis for each app, in which each app that is analyzed is also scored based on the policy for brand recognition and protection for the entity. If an app's score exceeds or meets a violation threshold (e.g., a score determined to indicate a high probability of a match), then the app can be determined to be in violation of the policy for brand recognition and protection for the entity. The app(s) (if any) determined to be in violation of the policy for brand recognition and protection for the entity and the score (if any) can be stored in brand data 116, which can then be used for reporting to the entity using portal 104. In one implementation, portal 104 includes a report generation interface that shows the customer the apps (e.g., along with supporting data) determined to be in violation of the policy for brand recognition and protection for the entity as further described herein.

In one embodiment, MDCE 118 scans applications in an automated manner to determine what data is included within the application. This data (e.g., app metadata) is extracted, stored, and used by CE 120 to determine if, for example, a brand associated with the entity is being used or is included within the app. For example, the app can include a collection of files that accompany the app, including executable code, resources, and all data contained within the application package. MDCE 118 can scan the app and can extract various data including, for example, the following: images, strings, keywords and phrases, URLs, email addresses, phone numbers, databases, Software Development Kits (SDKs) in use, and any other attributes and/or identifying information that may be related to or associated with the entity. The extracted data can be scanned and analyzed (e.g., decoded, parsed, and/or dissected) to determine whether the app is in violation of the policy for brand recognition and protection for the entity (e.g., if any brand names are being used by the app and/or other potential violations). In one embodiment, the application is analyzed both statically and dynamically to extract the app metadata, such as URLs within the app (e.g., including URLs that are dynamically resolved and followed URLs).

In one implementation, the associated market page(s) from which the app was downloaded from a public app store are also analyzed to determine whether the app is in violation of the policy for brand recognition and protection for the entity. For example, an app may misrepresent that is being provided by ACME Company through a public app store, which when reported to ACME Company, which is a customer of cloud service 122, can determine that the app is not being provided by ACME Company and can request that the app be removed from that public app store. As another example, if an app is reported as a violation of ACME Company's brand recognition and protection policy, then a user from ACME Company can verify whether the reported app is not authorized (e.g., or is otherwise in violation of ACME Company's policy for brand recognition and protection) and can select an option to have a takedown notice automatically generated and sent to the source of the app (e.g., public app store that is providing that app). In some cases, the user for ACME Company can verify that the identified app is an app that is authorized to be associated with ACME Company, which can then be used by cloud service 122 to associate the app (e.g., a hash of the app or other unique identifier can be used to indicate that this version of the app available on the source app store is authorized) with ACME Company to thereby prevent that app from being reported as a violation in future reports. In one implementation, ACME Company can also initially configure and periodically update a list of authorized apps associated with ACME Company using portal 104. The reports can also provide customers such as ACME Company an opportunity to provide a feedback look to verify which reported apps are actual violations of their brand recognition and protection policy and which are authorized apps and/or are false positives (e.g., are reported as potential violations, which can be indicated by a confidence metric in the app violations report, but are not actual violations, for example, the app may use a brand name associated with ACME Company, but in a manner that is not a brand violation from the perspective of ACME Company). Accordingly, the reporting and evaluating of reported app violations using portal 104 can provide for a feedback loop that can improve future results generated by cloud service 122.

In one embodiment, MDCE 118 includes multiple scanner engines, including a continuous scanner (CS) 124 and a desktop scanner (DS) 126, and also is in communication with distributed database 112 as shown. For example, the scanner engines can be run within cloud 122 (e.g., or can be implemented using other execution environments). In some implementations, the scanner engine results can be stored in a high performance database relating to the application metadata, shown as app metadata 114, accessible by all of the instances of the scanner engines currently in operation. As also shown, app metadata 114 is used in conjunction with brand data 116 by the CE 120 to determine whether the app is in violation of the policy for brand recognition and protection for the entity (e.g., if any brand names are being used by the app and/or other potential violations).

In one embodiment, CS 124 visits (e.g., periodically or based on a customer's request for an updated report) official and unofficial app markets (e.g., public and/or private app marketplaces, and/or various other unofficial sources of apps available via the Internet or World Wide Web), automatically downloads apps (e.g., without user intervention), and then automatically analyzes the downloaded apps. For example, CS 124 can perform various techniques as described herein for extracting features of the app to provide app metadata to app metadata store 114. This scanning can occur periodically or continually across app markets in a particular geography and/or for app markets around the world. In one implementation, when a scan of an app is conducted by CS 124 of MDCE 118, in addition to storing app metadata as described above, CS 124 can also determine and store one or more of the following: a date and time of the scan; a version of the application; a snapshot of the app market page advertising the app (e.g., source page from which the app was advertised/available for download from the source app store); a URL of the app store from which the application was downloaded; and any other data that is relevant to or indicates an application version, origin, or description of the app (e.g., developer related information, comments or reviews about the app on the app store, and/or other information). In some cases, if a newer version of the app has new content or behavior that violates an entity's brand recognition and protection policy, then a new entry can be created within distributed database 112 to record how the app has changed in this newer version and that such triggered a new or additional policy violation.

In one embodiment, DS 126 allows a user (e.g., an analyst) to specify an application or a URL that links to an application for analysis. For example, the analysis can specify any or all of the data that CS 124 collects in addition to other notes determined pertinent by an analyst.

In one embodiment, portal 104 provides a user portal that includes customer interface 108 that provides an interface that allows a customer to specify, for example, trade names, such as trademarks, brands, and logos that the customer owns or is associated with and wants to have the cloud service recognize and protect. For example, the customer can also specify any associated metadata, URLs, images, private SDK(s), authentication server(s), ad ID(s), and/or any other brand-specific data or resources that customer owns or is associated with and wants to have the cloud service recognize and protect. This customer provided information is stored in brand data 116 and used by CE 120 to determine if any analyzed apps violate the customer's brand recognition and protection policy.

In one implementation, portal 104 has multiple interfaces including the following: a brand specification interface; a report generation interface; a takedown notice interface (e.g., for automatically generating and sending out takedown notices to app stores or other web sites or hosted app sites); and an auto-analysis interface (e.g., to allow a user of a customer to upload a customer's authorized app(s) to automatically extract and identify unique features associated with the app, using techniques described above and as further described below). Each of these interfaces of the portal are further described below.

In one embodiment, the brand specification interface allows a user to specify trademarks and/or other features/resources associated with the user's entity. For example, features/resources associated with the user's entity can include one or more of the following: images, strings, keywords and phrases, URLs (e.g., a URL for an authentication server for the entity), email addresses, phone numbers, private or license restricted Software Development Kits (SDKs) in use, and any other entity or personally identifying information relating to the entity or brand associated with the entity. Many conglomerates can own a variety of trademarks and brands. For each trademark, an accompanying interface can be displayed that allows the user to input brand information described above. This information can then be uploaded to cloud storage 102 and all user-specified metadata can be stored in the distributed database relating to brand specification (e.g., stored in brand data 116 of distributed database 122). In one implementation, the user can specify brands of greater importance by entering a score that CE 120 can use in its calculation of a report that includes a score for each analyzed app in violation of a policy for the entity. For example, the user can also remove or add metadata through the brand specification interface. Due to the possibility of overmatching and obtaining false positives, the brand information can be pre-filtered before entering the database. The user can be prompted if they input a term that may overmatch. In one implementation, with each piece of metadata, the portal can perform a test query to determine the potential number of matching applications. This approach aids the user in ensuring that their brand specific information does not cause false positives.

In one embodiment, the report generation interface shows the user which apps include features that are in violation of a policy for brand recognition and protection for the entity. For example, CE 120 can continually or periodically update the reports as new scans of apps are completed. In one implementation, a user is able to specify alerts if an app is determined to violate the entity's policy and optionally specify a score threshold, which can, for example, notify (e.g., email or other form of communication/notification) the user when a threshold score is reached (e.g., and a customer can configure the period with which it requests updated reports based on a periodic update or updates triggered by new violations or severity of violations, such as based on threshold scoring violations and/or other triggers). For example, the report can include a sorted list of apps, from most policy violations to least policy violations. The user can also search across potential infringing applications (e.g., apps determined to be in policy violation) for keywords or other metadata to perform a more focused search of the reported app violations. In some cases, if multiple brands are infringed upon in a single app, each brand interface report can include an instance of the app. In one implementation, each brand has a separate report with the option of displaying a conglomerate report of all brands owned by the entity.

For example, the report generation interface can report app violations for ACME Company. The report can include a list of apps and source (e.g., app stores from which such apps can be downloaded), including a score, and extracted features that triggered policy violations for ACME Company's policy for brand recognition and protection. In some cases, the report can include a confidence metric for each app violation (e.g., pairwise compare for each feature, threshold requirements for each feature compare, features can have different weights, such as certain features can be indicated as critical features, such as an authentication site/server URL exact match, trademark(s) exact match, where as a potentially similar screen shot may be given a lower priority of violation). In one implementation, customers can configure or customize such priorities/weights. Also, a customer can provide feedback to a report by categorizing certain reported violations as, for example, a verified violation, a potential violation, or not a violation, and/or to allow users of the customer to include evaluation notes, and/or to adjust weighting/scoring and/or features of interest based on the report to provide a feedback loop to improve future app violation reporting results. As another example, the customer can verify whether one or more apps in an app violation list are policy violations or not (e.g., it is their new app or authorized app added to a public app store, for example, then the customer can white list the app that they know is valid and uploaded by them/approved to be at that source/app store and/or can provide a scanning service with a copy of their APK of approved app, which can be used to hash and verify such is the same approved app that is in that app store).

In one embodiment, the report generation interface includes a programmatic interface (e.g., a RESTful API) to allow customers to request app violation updates/reports, receive a feed of violation updates/reports, respond to app violation updates/reports, and/or upload their authorized apps for identification by the scanning service or for use by the auto feature extraction service. For example, the report generation interface can allow customers to provide features manually or to provide apps for auto feature extraction as described above. By providing such an interface to the report generation interface, customers can integrate these services into their own customized user interface for interacting with the cloud service for brand recognition and protection.

In one embodiment, the report includes the following for each potential infringing app: score of the app (e.g., a higher score indicates a higher probability of a policy violation); app name; a link(s) to where the app is being distributed; a screen shot(s) or copy of the infringing app's download page; and which brand, trademark keywords, and/or other features/resources that the app includes or is associated with that were determined to be in violation of the policy for the entity. For example, from this interface, the user can select which apps to generate takedown requests, as further described below.

In one embodiment, the takedown interface generates a DMCA or other form of takedown letter that can be emailed or printed to send to the source(s) (e.g., legal contact for the entity/organization of the source(s)) of the app(s) determined to be in violation of the policy for the entity. Additionally, the user can specify whether the market hosting the offending app should also receive a duplicate request. For example, the takedown request can also indicate which brand(s) was infringed upon by the offending app as well as any other relevant or supporting evidence extracted from or associated with the offending app (e.g., a screen shot of the app available on the offending app store site, and/or any other relevant information).

In one embodiment, the auto-analysis interface accepts a variety of file types to auto analyze for content. For example, the auto-analysis interface can accept and analyze one or more of the following: an app or collection of apps, with support for a wide variety of textual data and varied content included in or associated with the app(s) as described herein. Once a scan of the app is complete, metadata extracted from the app can be displayed to the user. From this interface, the user can add the discovered metadata selectively to infringing brands or create a new brand based on the submitted application or data. This approach allows a non-technical user ease of access to specifying brand information.

In one embodiment, the comparison engine (e.g., CE 120) is responsible for continuously aggregating the results of the user-specified brand infringement database (e.g., brand data 116) and the collected app metadata database (e.g., app metadata 114). For example, the comparison engine can scan the database of application metadata to determine if any metadata matches any of the user-specified or auto-generated brands or trademarks. This scanning process can include a variety of comparison techniques, from textual data to image data and a variety of confidences in the match, dependent on data type. If a predetermined, adjustable threshold is met or exceeded by a given app's score, then the violation can be reported (e.g., an infringe threshold).

In one implementation, the comparison engine (e.g., CE 120) performs a search using app metadata (e.g., app metadata 114) implemented using a search engine (e.g., open source Elasticsearch engine or other open source or commercially available search engines), in which the app meta data is stored in a data store (e.g., using open source database, such as JSON or Apache Lucene, or other open source or commercially available databases). For certain formats of content, different databases can be used for storing and search such content, such as for images and searching or other representations.

In one embodiment, a score is calculated based on the determined app violations of the policy for brand recognition and protection for the app (e.g., which can include an amount of brand infringing/violating material(s) contained within the app). In one implementation, this score is a weighted sum of the components of the app that is dependent upon, for example: the type of the infringing/violating feature(s)/material(s); the number of infringing/violating feature(s)/material(s); prominence/reputation of the source of the infringing/violating feature(s)/material(s); user/customer specified/configured weights of entity resources (e.g., brands or trademarks owned by or associated with the entity); and the popularity of the app (e.g., a number of app downloads). In some cases, due to the variety of the data collected by the comparison engine, different types of data can have an associated confidence with their match, which can affect the weighing of infringing infringing/violating material(s)/item(s).

In one embodiment, if a score of an app and its associated metadata exceeds the infringe threshold, a flag is set in the app metadata database (e.g., app metadata 114) such that the report generation interface can report this app violation. For example, the user can view the offending application and evidence of the policy violation in the portal (e.g., portal 104).

In one embodiment, a comparison of metadata includes techniques to perform matches and partial matches. For example, this comparison of metadata can include full and partial textual matches, image comparison and recognition (e.g., including across modified/skewed brand images), and custom extraction and comparison logic across all varieties of collected metadata in order to determine if a policy violation has occurred. As another example, images can be fingerprinted (e.g., using the SIFT algorithm, the SURF algorithm, or other techniques for fingerprinting images) for feature extraction and comparison or a message digest can be used. Some examples of formats, which can require custom extraction and comparison logic, include the following: sound files (e.g., .wav, .mp3), video formats (e.g., .mpg, .avi, .mkv), documents (e.g., .pdf, .doc, .xls), database files (e.g., .sqlite), shared object files and libraries (e.g., .so), and various other formats of files or compressed archives. In one implementation, a separate comparison engine can be used to implement comparison logic for each unique format.

In one implementation, a separate engine can be used to implement extraction and/or comparison logic for each unique format. In particular, various types of engines can be provided to provide extraction and/or comparison logics for different unique formats. For example, text strings can be extracted from code associated with the app (e.g., using constant propagation to find strings that do not change even as code is executed or to find strings that are dynamically propagates/dynamically generated, and/or using term frequency inverse document frequency (tf-idf) to find unique text strings in the code, and/or using various other test string analysis techniques, which can be used, for example, to identify words of interest, check term frequency and reverse term frequency to determine what are the important words, and whether such fit the characterization expected or not for the app being analyzed, such as based on the app category). As another example, included files can be extracted (e.g., which can involve parsing each file based on file type to find included files or other file types) to determine which may be suspicious (e.g., a bank's private SDK usage in the app can be suspicious or a policy violation). As yet another example, compressed archives can be unpacked/uncompressed to identify various file types (e.g., images, executables, and/or other file types) within such compressed archives (e.g., as such compressed archives can be used as detection evasion techniques by untrustworthy developers).

In one embodiment, extraction techniques range from certainty, such as the case of finding a direct text match of a trademark protected slogan or calculating a hash of a file (e.g., using md5, SHA-2 digest, or another hashing technique), to probabilistic, such as the case of finding a logo within another image, or comparing sound bites. The tradeoff with such different techniques is that while a digest provides certainty of matching, thereby reducing false positives, the rate of false negatives will increase, due to the sensitivity of the digest functions when data is perturbed, even slightly. Accordingly, based on the technique applied, a confidence metric can be associated with a match result for a given feature comparison (e.g., which can also be reported as a confidence interval for a policy or potential policy violation).

Figure 2:
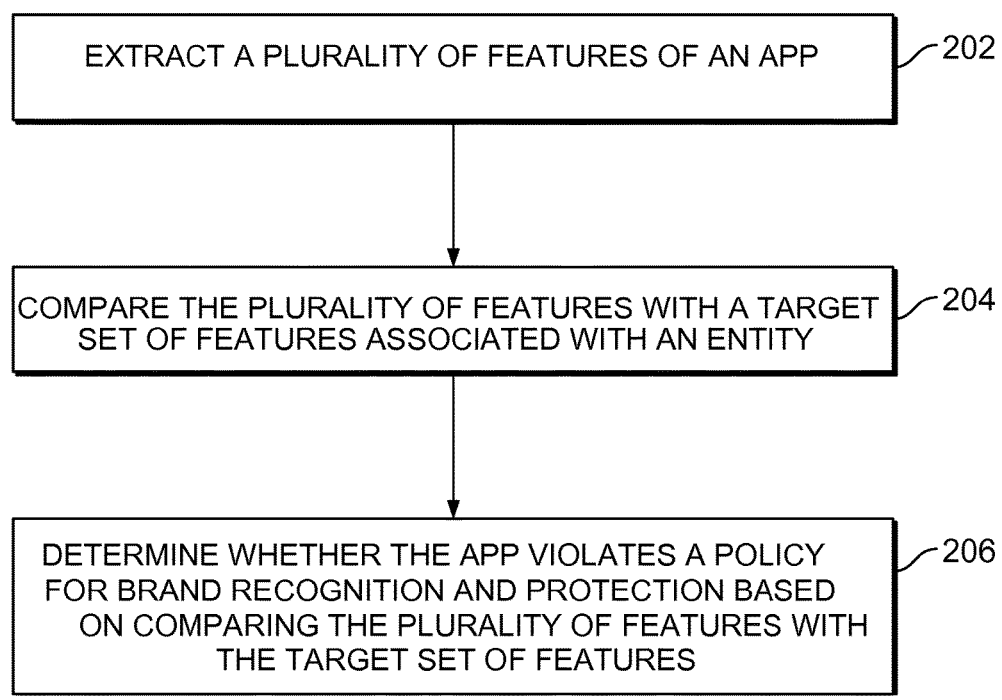
FIG. 2 is a flow diagram illustrating brand recognition and protection in apps for mobile devices in accordance with some embodiments.

FIG. 2 is a flow diagram illustrating brand recognition and protection in apps for mobile devices in accordance with some embodiments. In some embodiments, a process for brand recognition and protection in apps for mobile devices is implemented using the system described above with respect to FIG. 1. At 202, extracting a plurality of features of an app is performed. At 204, comparing the plurality of features with a target set of features associated with an entity is performed. At 206, determining whether the app violates a policy for brand recognition and protection for the entity based on the comparing the plurality of features with the target set of features associated with the entity is performed.

Figure 3:
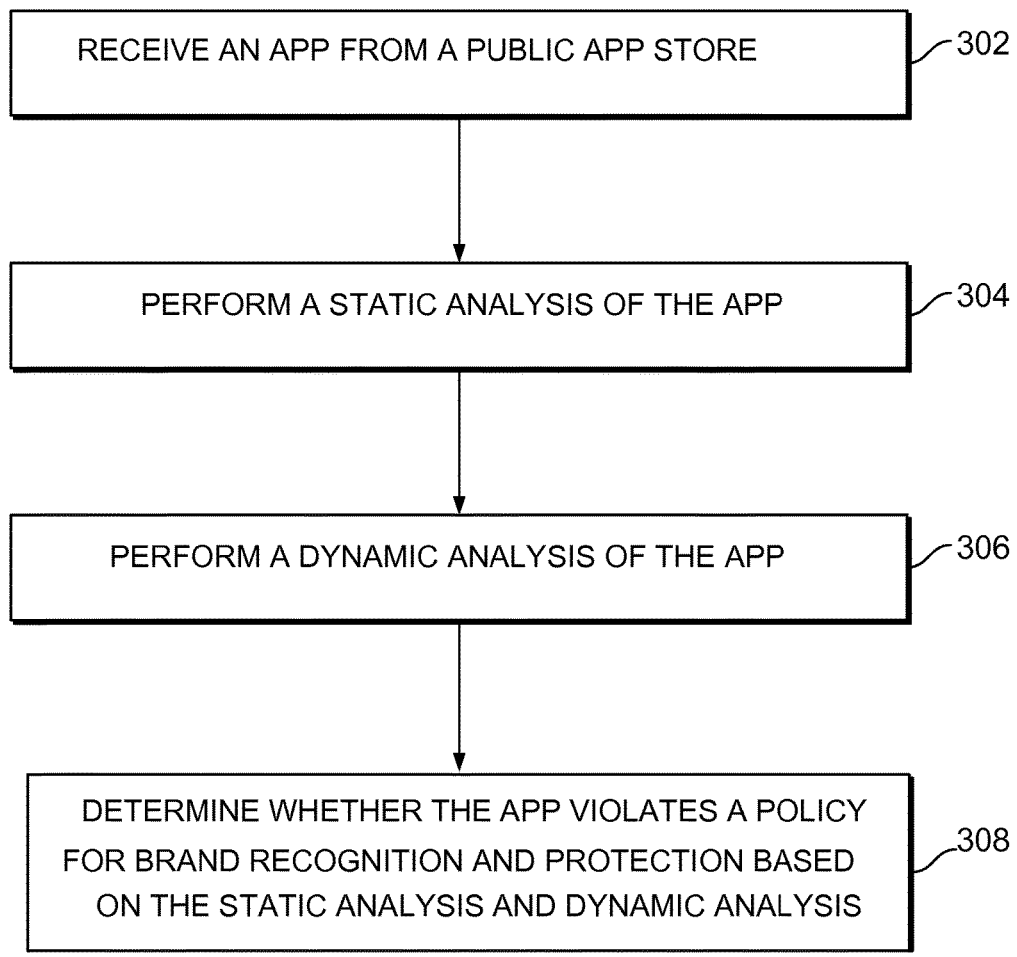
FIG. 3 is another flow diagram illustrating brand recognition and protection in apps for mobile devices in accordance with some embodiments.

FIG. 3 is another flow diagram illustrating brand recognition and protection in apps for mobile devices in accordance with some embodiments. In some embodiments, a process for brand recognition and protection in apps for mobile devices is implemented using the system described above with respect to FIG. 1. At 302, an app from a public app store is received. For example, apps can be downloaded in batch (e.g., periodically) from one or more public app stores or other official and unofficial app sources for analysis using various techniques described herein.

At 304, a static analysis of the app is performed. For example, performing static analysis can include performing a disassembly/byte code pass phase that includes inspecting byte code or assembly language (e.g., if applicable) of the app to determine what the app is supposed to do, such as how it is coded to perform (e.g., native instructions and virtual machine (VM) byte codes can be processed and analyzed, which can include extracting a control flow graph, method and function names, strings, data flow within the app's executable, and/or other information to facilitate a static analysis of the functionality performed by the app).

At 306, a dynamic analysis of the app is performed. For example, performing the dynamic analysis can include simulating a plurality of behaviors of the app during execution on a mobile device platform (e.g., performing an instrumented emulation that can include hosting a series or farm of emulators, such that once the app is executing in the emulated environment, the dynamic analysis phase can collect data, for example, on API calls that occur including the values returned from those APIs, so that a rule set can be applied to that data set, and/or GUI/screen shots functionality can be monitored and captured, and/or various other behaviors of the app can be monitored for performing various techniques, such as described herein with respect to various embodiments). For example, recording screenshots of a GUI of an app during execution of various stages of the app can be performed during a dynamic analysis of the app, which can be used for extracting and comparing text or images of GUI screenshots with entity resources to be protected against unauthorized use by the app (e.g., this can be implemented by executing the app in an emulation environment and recording screenshots of the executing app during time intervals for comparisons with an app(s) associated with the entity; or as another implementation, programmatically reconstructing the GUI elements based on other features of the app such as using XML layouts resources). This technique can be used to identify apps that attempt to, for example, masquerade as a banking app of ACME BANK (e.g., attempt to present copied or confusingly similar login and home page of the legitimate/authorized ACME BANK app(s), but are not valid/approved ACME BANK apps). As another example, URLs can be extracted during a dynamic analysis of the app to extract potentially obfuscated URLs (e.g., the process can also including visiting each URL's landing page(s) and performing a recursive level of text/image and link feature extraction/analysis, which can catch apps that purport to be a legitimate ACME Company app, but then when executed automatically visit another site and attempt to download a different app).

At 308, determining whether the app violates a policy for brand recognition and protection for an entity based on the static analysis and dynamic analysis is performed. In one embodiment, determining whether the app violates a policy for brand recognition and protection for the entity based on the static analysis and dynamic analysis includes comparing a plurality of features (e.g., extracted from the app or detected as being associated with the app during the static analysis and/or dynamic analysis) with a target set of features associated with the entity as described herein with respect to various embodiments. For example, the entity can customize the target set of features as described herein with respect to various embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for brand recognition and protection in applications ("apps") for mobile devices, comprising:
   a processor configured to:
      extract a plurality of features of an app;
      compare the plurality of features with a target set of features associated with an entity, wherein the comparing of the plurality of features with the target set of features associated with the entity comprises to:
      perform a dynamic analysis on the app, wherein the dynamic analysis simulates a plurality of behaviors of the app, and wherein the performing of the dynamic analysis comprises to:
         perform one or more of the following:
            a) determine an authentication server that the app attempts to authenticate with during execution to obtain an authentication server uniform resource locator (URL); and determine whether the authentication server URL is associated with the entity to determine whether a policy for brand recognition and protection for the entity is violated;

b) extract a feature associated with a software development kit (SDK); and determine whether the feature associated with the SDK is associated with the entity to determine whether the policy for brand recognition and protection for the entity is violated;

c) extract a trade name from the app, the trade name including a logo, a brand, a slogan, or any combination thereof; and determine whether the trade name associated with the app is associated with the entity to determine whether the app violates the policy for brand recognition and protection for the entity;

d) extract a screenshot, a graphical user interface (GUI) element, or both from the app during execution or emulated execution on a virtual device; and determine whether the screenshot, the graphical user interface (GUI) element, or both are associated with the entity to determine whether the app violates the policy for brand recognition and protection for the entity; or e) extract an ad network related information, an ad network identifier (ID), or both from the app; and determine whether the ad network related information, the ad network ID, or both are associated with the entity to determine whether the app violates the policy for brand recognition and protection for the entity;

determine whether the app violates the policy for brand recognition and protection for the entity based on the comparing the plurality of features with the target set of features of the entity;

calculate a score based on determined app violations of the policy for brand recognition and protection for the entity, the score including a weighted sum of components upon which the app depends, the components being selected from a group consisting of: type of violating features; number of violating features; reputation of a source of infringing features; and user specified weights of entity resources; and in response to a determination that the app violates the policy for brand recognition and protection for the entity, generate a report using the score, the report indicating that the app violates the policy for brand recognition and protection for the entity; and a memory coupled to the processor and configured to provide the processor with instructions.

2. The system recited in claim 1, wherein the app is determined to be in violation of the policy for brand recognition and protection for the entity if one or more of the extracted features are associated with one or more resources identified as associated with the entity, and the app is not authorized to be associated with the one or more resources identified as associated with the entity.

3. The system recited in claim 1, wherein the processor is further configured to:

receive the app for inspection.

4. The system recited in claim 1, wherein the processor is further configured to:

receive the app for inspection, wherein the app is available from a public app store.

5. The system recited in claim 1, wherein the processor is further configured to:

perform a static analysis on the app during the comparing the plurality of features with the target set of features associated with the entity.

6. The system recited in claim 1, wherein performing the dynamic analysis includes simulating a plurality of behaviors of the app during execution on a mobile device platform.

7. The system recited in claim 1, wherein the processor is further configured to:

generate a report based on the comparing the plurality of features with the target set of features of the entity.

8. The system recited in claim 1, wherein the processor is further configured to:

generate a score based on the comparing the plurality of features with the target set of features of the entity.

9. The system recited in claim 1, wherein the processor is further configured to:

generate a score based on the comparing the plurality of features with the target set of features of the entity; and output the score.

10. The system recited in claim 1, wherein the performing of the dynamic analysis comprises to:

perform three or more of the following:

a) determine an authentication server that the app attempts to authenticate with during execution to obtain an authentication server uniform resource locator (URL); and determine whether the authentication server URL is associated with the entity to determine whether a policy for brand recognition and protection for the entity is violated;

b) extract a feature associated with a software development kit (SDK); and determine whether the feature associated with the SDK is associated with the entity to determine whether the policy for brand recognition and protection for the entity is violated;

c) extract a trade name from the app, the trade name including a logo, a brand, a slogan, or any combination thereof; and determine whether the trade name associated with the app is associated with the entity to determine whether the app violates the policy for brand recognition and protection for the entity;

d) extract a screenshot, a graphical user interface (GUI) element, or both from the app during execution or emulated execution on a virtual device; and determine whether the screenshot, the graphical user interface (GUI) element, or both are associated with the entity to determine whether the app violates the policy for brand recognition and protection for the entity; or e) extract an ad network related information, an ad network identifier (ID), or both from the app; and determine whether the ad network related information, the ad network ID, or both are associated with the entity to determine whether the app violates the policy for brand recognition and protection for the entity.

11. The system recited in claim 1, wherein the performing of the dynamic analysis comprises to:

perform the following:
  a) determine an authentication server that the app attempts to authenticate with during execution to obtain an authentication server uniform resource locator (URL); and
    determine whether the authentication server URL is associated with the entity to determine whether a policy for brand recognition and protection for the entity is violated;
  b) extract a feature associated with a software development kit (SDK); and
    determine whether the feature associated with the SDK is associated with the entity to determine whether the policy for brand recognition and protection for the entity is violated;
  c) extract a trade name from the app, the trade name including a logo, a brand, a slogan, or any combination thereof; and
    determine whether the trade name associated with the app is associated with the entity to determine whether the app violates the policy for brand recognition and protection for the entity;
  d) extract a screenshot, a graphical user interface (GUI) element, or both from the app during execution or emulated execution on a virtual device; and
    determine whether the screenshot, the graphical user interface (GUI) element, or both are associated with the entity to determine whether the app violates the policy for brand recognition and protection for the entity; or
  e) extract an ad network related information, an ad network identifier (ID), or both from the app; and
    determine whether the ad network related information, the ad network ID, or both are associated with the entity to determine whether the app violates the policy for brand recognition and protection for the entity.

12. A method of brand recognition and protection in applications ("apps") for mobile devices, comprising:
  extracting, using a processor, a plurality of features of an app;
  comparing, using the processor, the plurality of features with a target set of features associated with an entity, wherein the comparing of the plurality of features with the target set of features associated with the entity comprises:
    performing a dynamic analysis on the app, wherein the dynamic analysis simulates a plurality of behaviors of the app, and wherein the performing of the dynamic analysis includes:
      performing one or more of the following:
      a) determining an authentication server that the app attempts to authenticate with during execution to obtain an authentication server uniform resource locator (URL); and
        determining whether the authentication server URL is associated with the entity to determine whether a policy for brand recognition and protection for the entity is violated;
      b) extracting a feature associated with a software development kit (SDK); and
        determining whether the feature associated with the SDK is associated with the entity to determine whether the policy for brand recognition and protection for the entity is violated;
      c) extracting a trade name from the app, the trade name including a logo, a brand, a slogan, or any combination thereof; and
        determining whether the trade name associated with the app is associated with the entity to determine whether the app violates the policy for brand recognition and protection for the entity;
      d) extracting a screenshot, a graphical user interface (GUI) element, or both from the app during execution or emulated execution on a virtual device; and
        determining whether the screenshot, the graphical user interface (GUI) element, or both are associated with the entity to determine whether the app violates the policy for brand recognition and protection for the entity; or
      e) extracting an ad network related information, an ad network identifier (ID), or both from the app; and
        determining whether the ad network related information, the ad network ID, or both are associated with the entity to determine whether the app violates the policy for brand recognition and protection for the entity;
    determining, using the processor, whether the app violates the policy for brand recognition and protection for the entity based on the comparing the plurality of features with the target set of features associated with the entity;
    calculating a score based on determined app violations of the policy for brand recognition and protection for the entity, the score including a weighted sum of components upon which the app depends, the components being selected from a group consisting of: type of violating features; number of violating features; reputation of a source of infringing features; and user specified weights of entity resources; and
    in response to a determination that the app violates the policy for brand recognition and protection for the entity, generating a report using the score, the report indicating that the app violates the policy for brand recognition and protection for the entity.

13. The method of claim 12, wherein the app is determined to be in violation of the policy for brand recognition and protection for the entity if one or more of the extracted features are associated with one or more resources identified as associated with the entity, and the app is not authorized to be associated with the one or more resources identified as associated with the entity.

14. The method of claim 12, further comprising:
  performing a static analysis on the app during the comparing the plurality of features with the target set of features associated with the entity.

15. The method of claim 12, wherein performing the dynamic analysis includes simulating a plurality of behaviors of the app during execution on a mobile device platform.

16. A computer program product for brand recognition and protection in applications ("apps") for mobile devices, the computer program product being embodied in a tangible non-transitory computer readable storage medium and comprising computer instructions for:
  extracting a plurality of features of an app;
  comparing the plurality of features with a target set of features associated with an entity, wherein the comparing of the plurality of features with the target set of features associated with the entity comprises:

performing a dynamic analysis on the app, wherein the dynamic analysis simulates a plurality of behaviors of the app, and wherein the performing of the dynamic analysis includes:
performing one or more of the following:
a) determining an authentication server that the app attempts to authenticate with during execution to obtain an authentication server uniform resource locator (URL); and
determining whether the authentication server URL is associated with the entity to determine whether a policy for brand recognition and protection for the entity is violated;
b) extracting a feature associated with a software development kit (SDK); and
determining whether the feature associated with the SDK is associated with the entity to determine whether the policy for brand recognition and protection for the entity is violated;
c) extracting a trade name from the app, the trade name including a logo, a brand, a slogan, or any combination thereof; and
determining whether the trade name associated with the app is associated with the entity to determine whether the app violates the policy for brand recognition and protection for the entity;
d) extracting a screenshot, a graphical user interface (GUI) element, or both from the app during execution or emulated execution on a virtual device; and
determining whether the screenshot, the graphical user interface (GUI) element, or both are associated with the entity to determine whether the app violates the policy for brand recognition and protection for the entity; or
e) extracting an ad network related information, an ad network identifier (ID), or both from the app; and
determining whether the ad network related information, the ad network ID, or both are associated with the entity to determine whether the app violates the policy for brand recognition and protection for the entity;
determining whether the app violates the policy for brand recognition and protection for the entity based on the comparing the plurality of features with the target set of features associated with the entity;
calculating a score based on determined app violations of the policy for brand recognition and protection for the entity, the score including a weighted sum of components upon which the app depends, the components being selected from a group consisting of: type of violating features; number of violating features; reputation of a source of infringing features; and user specified weights of entity resources; and
in response to a determination that the app violates the policy for brand recognition and protection for the entity, generating a report using the score, the report indicating reporting that the app violates the policy for brand recognition and protection for the entity.

17. The computer program product recited in claim 16, wherein the app is determined to be in violation of the policy for brand recognition and protection for the entity if one or more of the extracted features are associated with one or more resources identified as associated with the entity, and the app is not authorized to be associated with the one or more resources identified as associated with the entity.

18. The computer program product recited in claim 16, further comprising computer instructions for:
performing a static analysis on the app during the comparing the plurality of features with the target set of features associated with the entity.

19. The computer program product recited in claim 16, wherein performing the dynamic analysis includes simulating a plurality of behaviors of the app during execution on a mobile device platform.

* * * * *

UNITED STATES PATENT AND TRADEMARK OFFICE
CERTIFICATE OF CORRECTION

PATENT NO. : 10,387,889 B1
APPLICATION NO. : 14/055096
DATED : August 20, 2019
INVENTOR(S) : Steve Hanna et al.

Page 1 of 1

It is certified that error appears in the above-identified patent and that said Letters Patent is hereby corrected as shown below:

In the Claims

In Column 20 Line 20, please delete "reporting"

Signed and Sealed this
First Day of October, 2019

Andrei Iancu
*Director of the United States Patent and Trademark Office*